(12) United States Patent
Reiman et al.

(10) Patent No.: US 7,404,592 B2
(45) Date of Patent: Jul. 29, 2008

(54) VEHICLE FAIRING SYSTEM

(75) Inventors: James Reiman, Winnetka, IL (US); Peter Heppel, Courceroy (FR)

(73) Assignee: Aerofficient, LLC, Winnetka, IL (US)

( * ) Notice: Subject to any disclaimer, the term of this patent is extended or adjusted under 35 U.S.C. 154(b) by 0 days.

(21) Appl. No.: 11/684,104

(22) Filed: Mar. 9, 2007

(65) Prior Publication Data

US 2008/0061598 A1    Mar. 13, 2008

Related U.S. Application Data

(60) Provisional application No. 60/844,442, filed on Sep. 13, 2006, provisional application No. 60/844,511, filed on Sep. 13, 2006.

(51) Int. Cl.
*B60R 27/00* (2006.01)
(52) U.S. Cl. .................. 296/180.4; 296/180.1
(58) Field of Classification Search ........... 296/180.1, 296/180.2, 180.3, 180.4, 180.5
See application file for complete search history.

(56) References Cited

U.S. PATENT DOCUMENTS

| | | | |
|---|---|---|---|
| 2,101,793 A | 12/1937 | Field, Jr. | |
| 3,711,146 A | 1/1973 | Madzsar et al. | |
| 3,834,752 A | 9/1974 | Cook et al. | |
| 3,934,922 A * | 1/1976 | MacCready et al. | 296/180.4 |
| 4,022,508 A * | 5/1977 | Kirsch et al. | 296/180.4 |
| 4,036,519 A | 7/1977 | Servais et al. | |
| 4,142,755 A | 3/1979 | Keedy | |
| 4,156,543 A | 5/1979 | Taylor et al. | |
| 4,311,334 A | 1/1982 | Jenkins | |
| 4,360,232 A * | 11/1982 | Elder | 296/180.4 |
| 4,518,188 A | 5/1985 | Witten | |
| 4,553,782 A | 11/1985 | Markland | |
| 4,611,847 A | 9/1986 | Sullivan | |
| 4,682,808 A | 7/1987 | Bilanin | |
| 4,688,841 A | 8/1987 | Moore | |
| 4,693,506 A | 9/1987 | Massengill | |
| 4,702,509 A | 10/1987 | Elliott, Sr. | |
| 4,746,160 A | 5/1988 | Wiesemeyer | |
| 4,779,915 A | 10/1988 | Straight | |
| 4,824,165 A | 4/1989 | Fry | |
| 4,904,015 A | 2/1990 | Haines | |
| 5,078,448 A | 1/1992 | Selzer et al. | |
| 5,595,419 A | 1/1997 | Spears | |
| 5,658,038 A | 8/1997 | Griffin | |
| 6,428,084 B1 | 8/2002 | Liss | |
| 6,799,791 B2 * | 10/2004 | Reiman et al. | 296/180.1 |
| 6,986,544 B2 | 1/2006 | Wood | |
| 7,008,005 B1 | 3/2006 | Graham | |
| 2003/0057736 A1 * | 3/2003 | Long et al. | 296/180.4 |
| 2004/0239146 A1 | 12/2004 | Ortega et al. | |

\* cited by examiner

*Primary Examiner*—Lori L Lyjak
(74) *Attorney, Agent, or Firm*—Fitzpatrick, Cella, Harper & Scinto

(57) ABSTRACT

A combination of vehicle fairing structures forming a fairing system having a front end structure, a rear end structure, and first and second side structures, for optimizing the aerodynamic profile of vehicles, especially tractor-trailer combinations.

6 Claims, 5 Drawing Sheets

VEHICLE FAIRING SYSTEM

This application claims the benefit of priority U.S. Provisional Application No. 60/844,442 and U.S. Provisional Application No. 60/844,511, each filed Sep. 13, 2006, and which are each incorporated by reference herein.

BACKGROUND OF THE INVENTION

1. Field of the Invention

This invention relates to a system for improving the aerodynamic profile of vehicles utilizing front end, rear end and side vehicle fairing structures, especially for use on a tractor-trailer. The system improves fuel consumption without affecting loading and unloading operations.

2. Description of Related Art

The amount of power needed to move a vehicle over land or through the air increases with the speed of the vehicle due to aerodynamic drag. The amount of power necessary to overcome aerodynamic drag directly translates into increased fuel consumption, and thus cost of operation.

A variety of innovations aimed at reducing the aerodynamic drag of various transport vehicles, including tractor-trailer combinations, have been introduced in the prior art. These include efforts to make the hood, windscreen, fenders etc. more streamlined in form, as well as by adding fairings to the cab roof, and in some cases, to the trailer box.

U.S. Pat. No. 6,799,791 discloses a vehicle fairing structure that may be deployed on the rear of a trailer box. While this fairing structure significantly reduces drag at the rear end of the trailer box a significant amount of drag is also associated with the front of the trailer box, where there is known to be an area of high pressure and relatively stagnant air approximately at the middle of the forward vertical face of the trailer cab. A front fairing structure adapted to be positioned in the gap between a tractor and a trailer in a tractor-trailer combination is disclosed in a U.S. Provisional Patent Application No. 60/844,511, and in a non-provisional application claiming the benefit of priority thereof, filed concurrently herewith. All of the aforesaid patent and applications (U.S. Pat. No. 6,799,791, Provisional Application No. 60/844,511 and the non-provisional application filed herewith [Attorney Docket No. 02916.00003]) are incorporated by reference herein.

U.S. Pat. No. 4,746,160 discloses a semi-trailer truck with front air flow panels and fabric side skirts, but does not address the problem of drag at the rear end of the trailer box. Similarly, U.S. Pat. No. 4,611,847 discloses inflatable/extendable skirts along the side of a tractor-trailer to reduce air drag, but does not address the problem of drag at the top or rear ends of the vehicle.

The claimed invention fills the gaps left by prior disclosures by providing a vehicle fairing system comprising vehicle fairing structures that function together to optimize the aerodynamic profile of a vehicle.

SUMMARY OF THE INVENTION

The invention is a vehicle fairing system for a vehicle having a front vehicular component and a rear vehicular component in tandem and separated by a gap, for optimizing the efficiency of vehicles by improving their aerodynamic profile, and thus reducing the amount of power needed to overcome aerodynamic drag, thereby reducing fuel consumption without affecting loading and unloading operations. The system comprises front end, rear end, and side vehicle fairing structures.

In one aspect of the invention, the front end vehicle fairing structure comprises a top surface adapted to be attached to the front end of the roof of the rear vehicular component (sometimes referred to herein as the "horizontal surface") and two side surfaces each adapted to be attached to respective sides of the rear vehicular component and joining opposite ends of the top surface and generally perpendicular to the top surface. Each of the horizontal and vertical surfaces has a proximal edge adapted to be positioned adjacent a vehicle, and a distal edge adapted to be positioned away from the vehicle with respect to the respective proximal edge. The area bounded by the distal edges of the surfaces is smaller than an area bounded by the proximal edges. The fairing structure is positioned adjacent a rear vehicular component (in preferred embodiments, the front of a trailer box) in a gap between said rear vehicular component and a front vehicular component (such as a tractor cab), sufficiently close to the front vehicular component to impede or otherwise lessen transverse and vertical airflow in the gap, lessening aerodynamic drag. This is accomplished by positioning the distal and proximal edges of the surfaces relative to each other such that the fairing structure, when positioned adjacent the rear vehicular component in the gap, re-directs air from the rear vehicular component and additionally impedes or otherwise lessens air flow in the gap, forming an effective closure of the gap.

In the most preferred embodiment, the vehicle fairing structure is positioned in the gap between a tractor and a trailer box in a tractor-trailer combination, such that the proximal edges of the top and side surfaces attach to the leading top and side edges, respectively, of the front of the trailer box, and the top and first and second side surfaces (collectively the "airing surfaces") are curved so that the distal edges bound an area inboard of the sides of the trailer box. For this purpose, although not a requirement, the fairing surfaces may be attached directly to the roof or top and front side edges of the trailer box, forming an uninterrupted surface from the fairing structure to the trailer. The front end fairing structure is disclosed in the aforesaid U.S. patent application filed concurrently herewith, and the features of the fairing structure described in said application are incorporated by reference as if set forth fully herein.

The rear end structure comprises a first semi-rigid surface having a curved edge, with the first semi-rigid surface secured to the vehicle in a manner that permits the first semi-rigid surface to assume two positions: a first position adjacent to the vehicle, and a second position extended from the vehicle. There is further provided a first joint structure that spans the first semi-rigid surface, to permit the first semi-rigid surface to be folded when in the first position and unfolded when in the second position. The first semi-rigid surface advantageously acts as a single panel when fully deployed, while converting to two panels to facilitate retraction and storage. There is further a second semi-rigid surface having a curved edge, with the second semi-rigid surface secured to the vehicle in a manner that permits the second semi-rigid surface to assume a first position adjacent the vehicle element and a second position extended from the vehicle element. The first and second semi-rigid surfaces are joined together at their first and second curved edges by a second joint structure adapted to permit the first and second semi-rigid surfaces to fold approximately together when the first and second semi-rigid surfaces are adjacent the vehicle. The rear end structure is designed so as not to impact loading and unloading operations, and may incorporate additional features, more fully described in the aforesaid U.S. Pat. No. 6,799,791 B2, incorporated herein by reference as if fully set forth herein.

The first and second side structures each comprise a surface extending generally vertically toward the ground from the sides of the vehicle. Each such side surface has a first edge toward the front of the vehicle and a second edge toward the rear of the vehicle, which in preferred embodiments curve inward toward the center line of the vehicle. The side fairing structures extend along the respective sides of the trailer box. In preferred embodiments, a rear portion of a respective side fairing structure is behind the rear wheels of the trailer and a front portion of the side fairing structure extends along the side of the trailer, terminating to the rear of the rear wheels of the tractor cab. The rear and front portions may comprise a single integral piece, several attached pieces, or there may be multiple, separate side fairing substructures which together form the side structure.

In this disclosure, a surface or panel is "semi-rigid" when it is of such thickness and material properties that, when flat, its bending stiffness and strength are low enough to permit the panel to bend elastically, without permanent deformation, to a radius of the same order of magnitude as the panel's width or height, and yet, when so bent elastically, the panel has sufficient resistance to buckling to enable it to resist load as a shell structure. Because the bending is elastic, the surface will re-assume a planar geometry upon ending the application of the external force used to create the bending. This semi-rigid construction can be achieved by forming each of the fairing surfaces from a sheet of material such as sheet polypropylene.

DETAILED DESCRIPTION OF THE PREFERRED EMBODIMENTS

Figure 1:
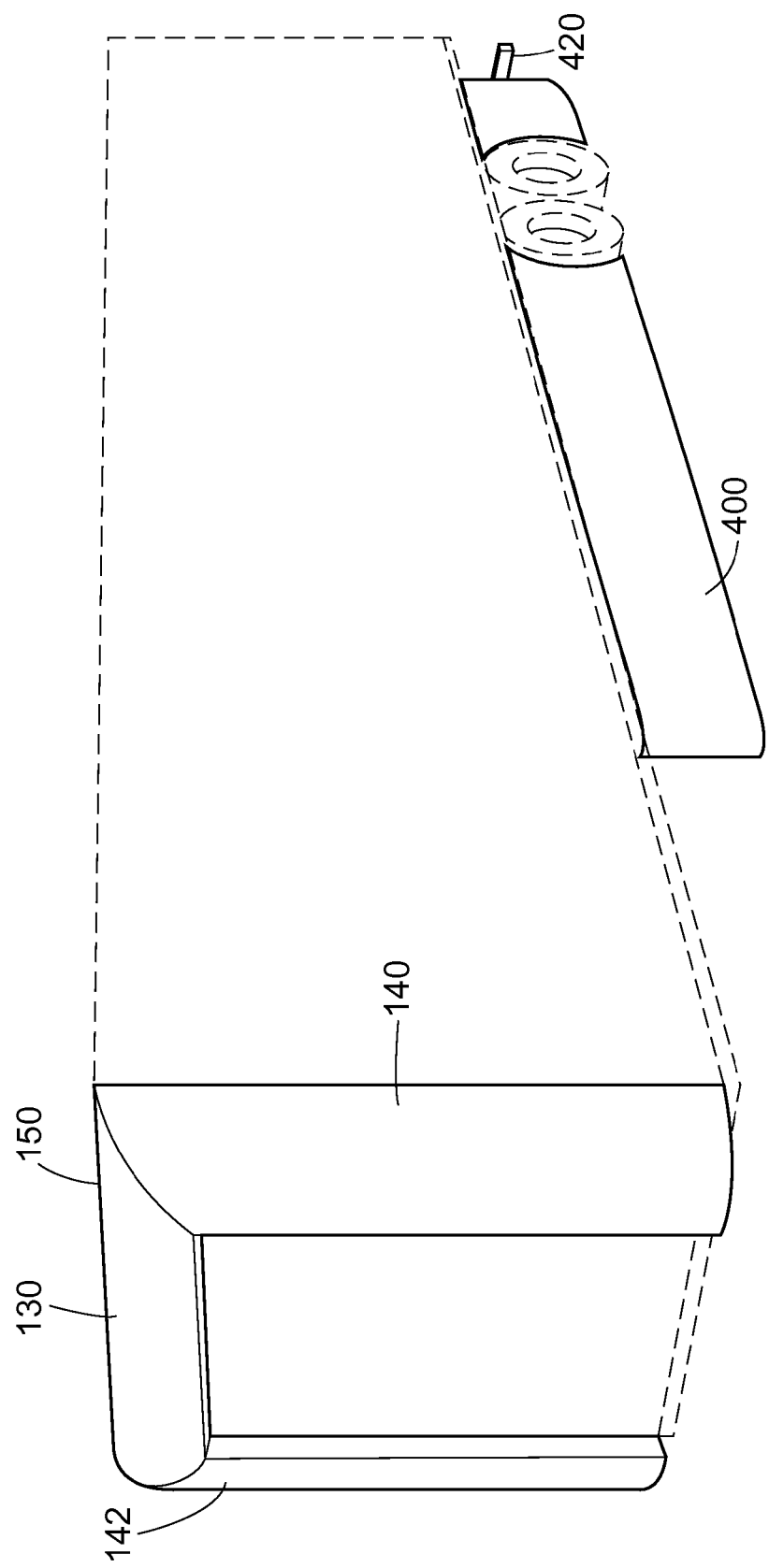
FIG. 1 is a perspective view of a tractor-trailer combination incorporating a front fairing on the trailer box according to the invention.

It is believed that the vehicle fairing system disclosed herein significantly increases the efficiency of vehicles, particularly tractor-trailers, by improving their aerodynamic profile, and thus reducing aerodynamic drag, without affecting loading and unloading operations.

The large rectangular ends of typical trailer boxes create an area of reduced pressure behind the trailer box as it moves over the highway. In addition, in such tandem vehicle arrangements, the rear vehicular component often projects above the front vehicular component and thus causes additional aerodynamic drag of a type referred to as form drag. Also, in such tandem vehicle arrangements, the rear vehicular component is separated from the front vehicular component by a gap, which also creates aerodynamic drag. All of these phenomena increase wind resistance, and thus decrease the efficiency of the vehicle. Still further, air currents are produced underneath a moving tractor-trailer, which also increases drag.

To describe the drag created by the gap between the front and rear vehicular components, the near wake of a bluff backed object like a tractor cab may be described as a region of slower (or even reversed) flow, bounded by a shear layer. The shear layer is the boundary between the faster moving external flow and the slow moving air dragged along behind the cab. In the absence of cross wind, there is a general flow upwards in the gap, driven by the low pressure at the top of the gap. This tends to increase the size of a separation bubble formed on the forward edge of the trailer roof, which increases drag.

There is also in connection with the movement of the tractor-trailer combination, a horseshoe vortex, having a center extending below the trailer. The rotation of the vortex tails tends to pick up spray from the road wheels, throwing it up and out.

Cross wind creates a general flow from the windward to the leeward side, which is faster at the back of the gap than at the front. The flow may be sufficiently strong to sweep away the horseshoe vortex and replace it with a single vertical vortex (not shown in the figures). Additionally, a stagnation line may form near the windward edge of the trailer forward face, which creates a region of high pressure, and therefore additional aerodynamic drag, and also creates a vortex in the opposite sense, between the stagnation line and the bubble at the front of the trailer side, which further increases drag.

In view of the foregoing general observations on the gap aerodynamics, the requirements of the fairing structure may be discussed in terms of the effect of the external face and the internal face. For the external face, a first requirement is that the distal edges should be positioned inside the volume bounded by the shear layer. In the absence of cross-wind, this simply means making the area bounded by the distal edges small enough to be generally no larger than the cab area projected rearward. However, when there is crosswind, the cab wake is displaced downwind, so that on the windward side the distal edge must be farther in, close enough to the center line that the above requirement is still met. In either case, fast moving air is prevented from impinging on the forward face of the trailer.

For the internal face, in the absence of cross-wind, the fairing tends to reduce or reverse the upwards flow, which consequently reduces the separation bubble on the trailer roof, which reduces drag and reduces the strength of the horseshoe vortex. In the presence of cross-wind, the fairing structure reduces or reverses the upward flow (as in the case of no-crosswind), but also reduces or reverses the general leeward flow, again reducing drag. The fairing structures also block air from entering the gap.

The fairing system disclosed herein takes the foregoing into account to ameliorate the aerodynamic drag in the front, rear and under portion of a moving tractor-trailer.

Figure 5:
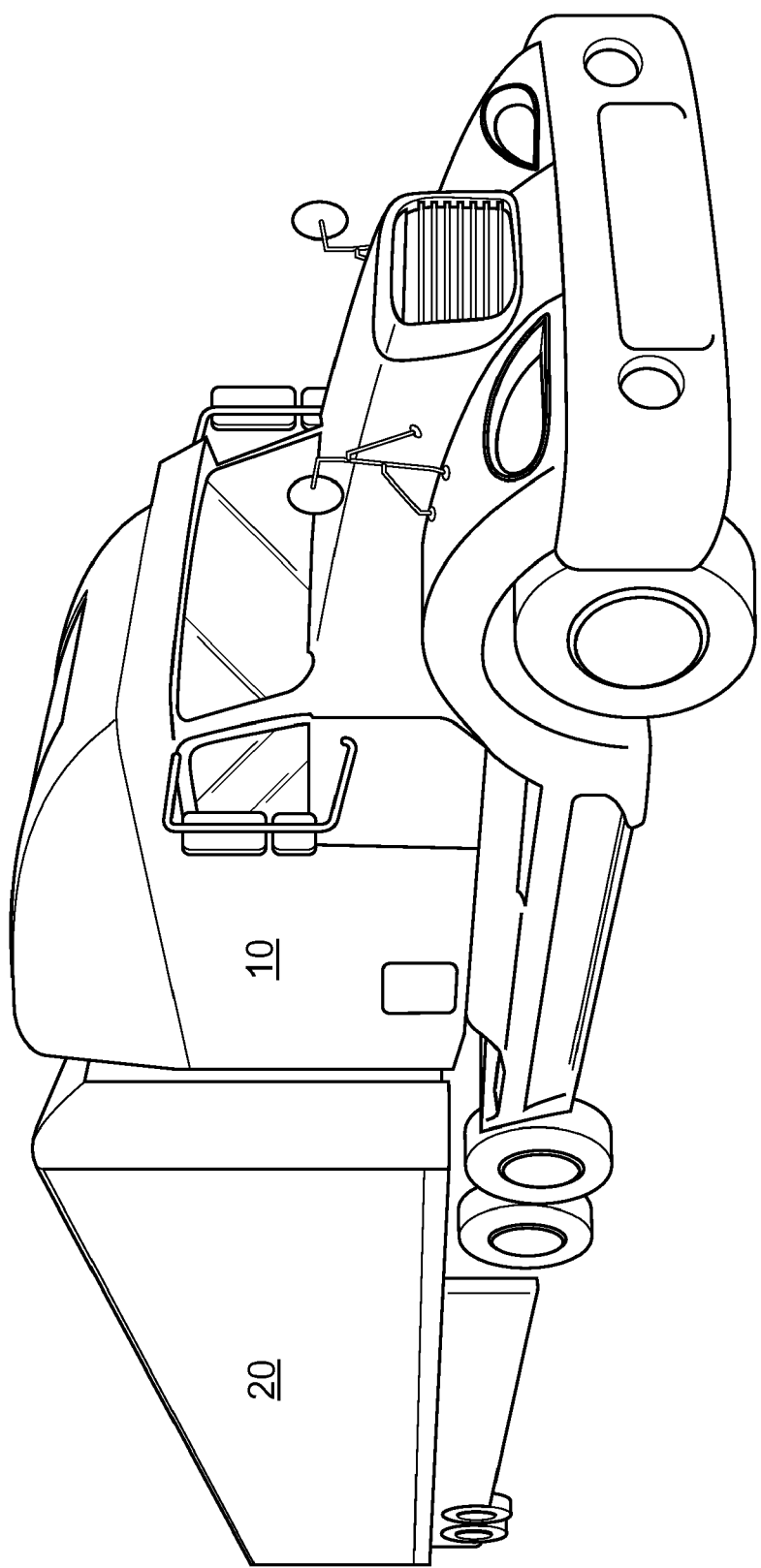
FIG. 5 is a perspective view of a tractor-trailer combination incorporating a fairing structure according to the invention.

In FIG. 5, a tractor cab 10 is the front vehicular component. Viewed head-on, the tractor cab has a projection or outline. This is also referred to as the "profile" of the tractor cab, or front vehicle component.

Figure 2:
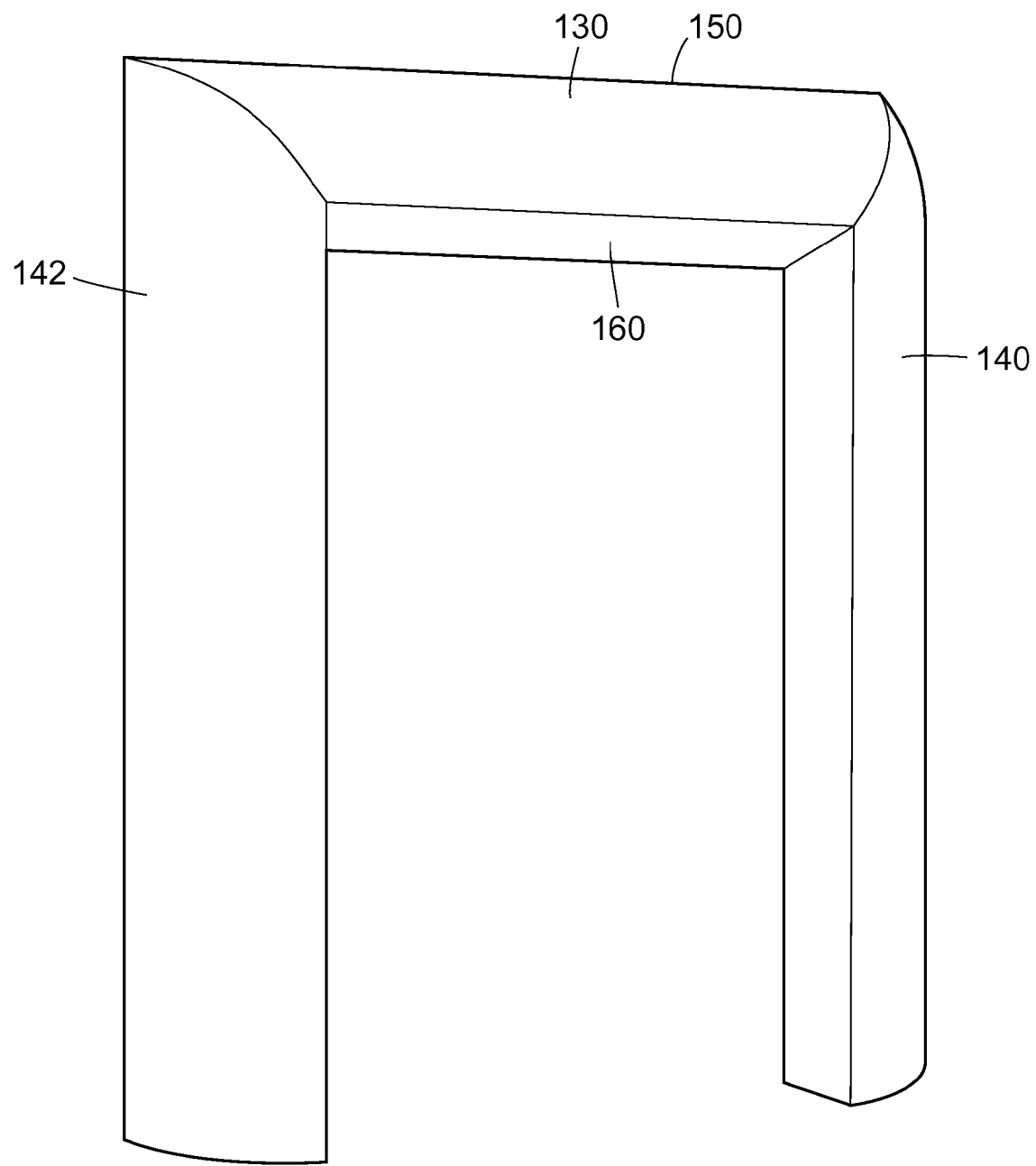
FIG. 2 is a detail of the fairing structure according to the invention.

In FIG. 2, the front end fairing structure comprises horizontal top surface 130 and first and second vertical side surfaces 140, 142. Each of the horizontal and first and second vertical surfaces is rigid or semi-rigid in construction. Suitable materials for these surfaces are polypropylene, fiberglass, metal, and the like. These separate sheets are then joined together by appropriate mechanical elements to form a substantially continuous fairing surface.

Each of the horizontal and first and second vertical surfaces has a proximal edge adapted to be positioned adjacent a rear vehicular component 20, which is typically a trailer box in a tractor-trailer combination. Attachment may be permanent, such as by riveting, or temporary, using appropriate hardware allowing for ease of replacement or removal. Preferably, the boundary between where the front edges 150 of the trailer box or rear vehicular component 20 meets the fairing structure is continuous so that no substantial barrier to air flow is created at that point. If desired, the fairing surfaces may be riveted or otherwise directly attached to the trailer box without hardware needing to be attached to the forward face of the trailer box. Preferably, the boundary between the front edges 150 of the trailer box or rear vehicle component 20 and the fairing structure is continuous so that no substantial barrier to air flow is created at that point.

Optional support walls 160 may attach to the distal edges of the horizontal and vertical edges of the fairing surfaces and are, for example (but not necessarily), perpendicular to the leading surface of the trailer box. These support walls join with the front surface of the trailer box using the same or similar attachment hardware as may be used to attach the fairing surfaces to the edges of the trailer box.

Each of the horizontal and first and second vertical surfaces has a distal edge adapted to be positioned away from the rear vehicular component with respect to the respective proximal edge. The fairing surfaces curve inward so that an area bounded by the distal edges of the fairing surfaces is smaller than an area bounded by the proximal edges. In a tractor-trailer, this simply means that the distal edges of the fairing structure are inboard of the trailer box. It is also preferred that the distal edges of the fairing structure surfaces are inboard of the front vehicular component profile. It is preferred that the distal edges of the fairing surfaces are positioned inside a volume bounded by the shear layer. Preferably, the distal edges of the fairing surfaces bound a substantially vertical planar area inside a volume bounded by the shear layer.

Figure 3:
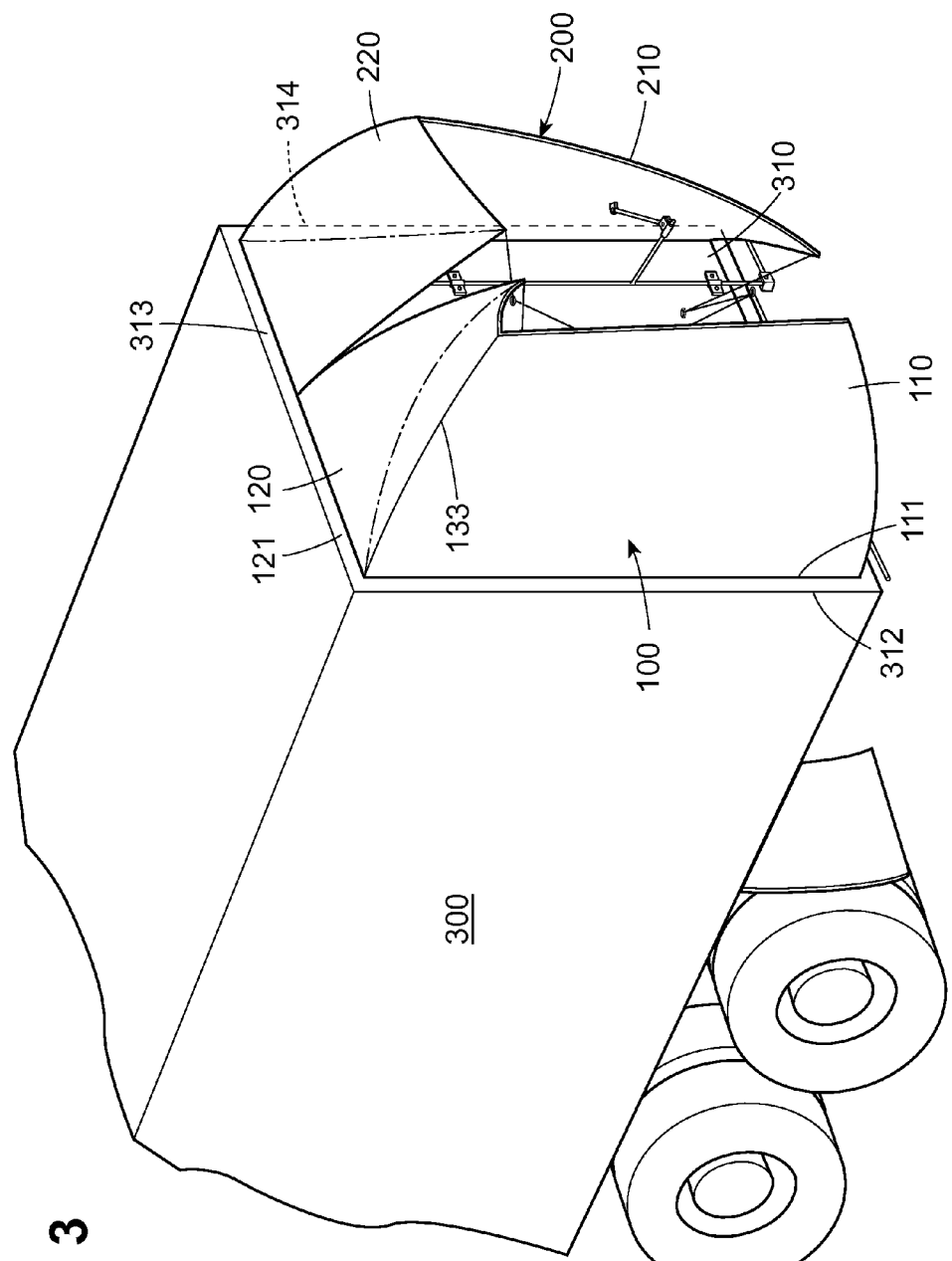
FIG. 3 is a detail of the rear end fairing structure.

In FIG. 3, there is shown an exemplary embodiment of the rear end structure, which includes two principal assemblies, a first fairing assembly 100 and a second fairing assembly 200. These assemblies are secured to the rear portion of a vehicle, which as shown in the figures is the rear portion of a truck trailer box 300, although this invention can be utilized to reduce drag in any transport vehicle or means having a relatively blunt rear. The rear of trailer box 300 in FIG. 3 is a vertical surface, and preferably comprises two doors, as is known in the art, which are hinged to rotate in proximity to the axes defined by vertical rear trailer edges 312 and 314. This hinge arrangement permits the doors to open and close by pivoting approximately about edges 312 and 314.

Assemblies 100 and 200 are identical, except that assembly 200 is a mirror image of assembly 100. For convenience, the following description will generally refer to the components of assembly 100 only, it being recognized that the description applies equally well to assembly 200.

Figure 4:
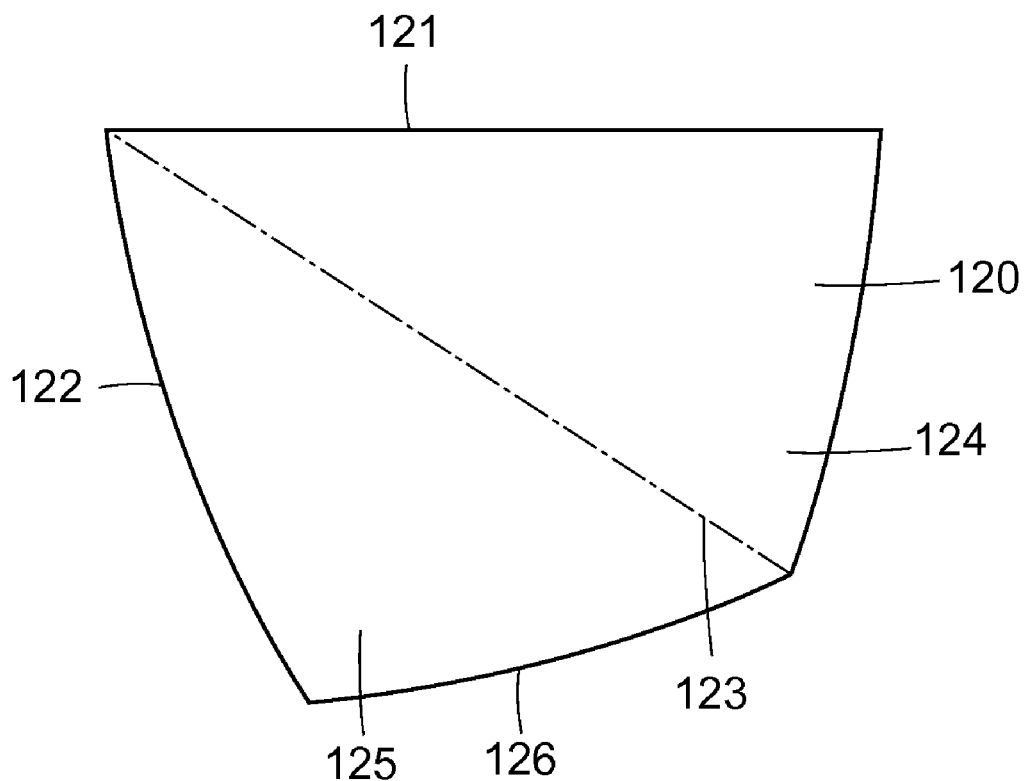
FIG. 4 is a detail of the structure depicted in FIG. 3.

Assembly 100 includes two principal components, a vertical fairing surface 110 and a horizontal fairing surface 120. Referring to FIG. 4, horizontal fairing surface 120 has a joint structure 123 spanning horizontal fairing surface 120 from the intersection of terminal portion 121 and curved edge 122 to, in this case, the diagonally opposite corner of horizontal fairing surface 120. The purpose of joint structure 123 is to allow the two parts of horizontal fairing surface 120, specifically horizontal center panel 124 and horizontal side panel 125, to fold together when fairing assembly 100 is stowed against the trailer body. Accordingly, while shown in FIG. 4 to span surface 120 diagonally, in a preferred embodiment, the orientation of joint structure 123 is in accordance with the orientation that will most easily permit panels 124, 125 of horizontal fairing surface 120 to fold together and against vertical fairing surface 110 in a compact manner without significantly stressing or bending the components, or requiring undue force to hold the folded assembly together. Joint structure 123 allows rotation of panels 124, 125 relative to each other, while also permitting bending of the joint structure 123 as such rotation proceeds. While depicted as linear, joint structure 123 optionally can be curved, as a means for imparting more shape.

Further details concerning assemblies 100 and 200 are disclosed in the U.S. Pat. No. 6,799,791, the contents of which are incorporated by reference herein.

As shown in FIG. 1, the first and second side structures 400 (only one such structure shown in FIG. 1) each comprise a surface extending vertically toward the ground and are adapted to be attached to opposite sides of a vehicle, shown as a tractor-trailer in the Figure. The surfaces have a first edge toward the front of the vehicle and a second edge toward the rear of the vehicle. In a preferred embodiment, the surfaces of the first and second side structures are formed to fit around the rear wheels of the vehicle, as shown in FIG. 5, and the first and second edges of the first and second side structures curve inward toward the center of the vehicle. In a more preferred embodiment, first and second panels extend from the second edge of each side structure toward the rear end of the vehicle at an angle between 90 and 180 degrees. In a most preferred embodiment, an element 420 connecting the first and second panels extending from the second edge of each side structure, as shown (partially) in FIG. 1. The element may also be connected to the rear of the vehicle by bars or other structures made from an appropriate material, such as that of which the vehicle is made. Additionally, the element may comprise safety features such as lights or reflective tape.

Without wishing to be bound by theory, it is believed that the vehicle fairing structures work more effectively when combined in a system on a vehicle with front and rear vehicular components. For example, the side fairing structures and the fairing structure on the front end of the trailer box both contribute to improving the aerodynamics at the front of the trailer, as well as under the trailer, and there is believed to be beneficial interaction of these effects. Likewise for example, the side fairing structures and rear end structures both improve the aerodynamic flow behind the trailer, and again it is believed that there is a beneficial interaction of those effects.

The foregoing detailed description is for illustration only and is not to be deemed as limiting the invention, which is defined in the appended claims.

What is claimed is:

1. A vehicle fairing system for a vehicle having a front vehicular component and a rear vehicular component in tandem and separated by a gap, comprising:

a front end structure, a rear end structure, and first and second side structures;

the front end structure comprising a top fairing surface adapted to be attached to a top surface of the rear vehicular component;

a first side surface adapted to be attached to a first side of the rear vehicular component, joining a first end of the top surface and generally perpendicular to the top surface;

a second side surface adapted to be attached to a second side of the rear vehicular component, joining a second end of the top surface opposite the first end and generally perpendicular to the top surface;

each of the top and first and second side surfaces having a proximal edge adapted to be positioned adjacent a vehicle;

each of the top and first and second vertical surfaces having a distal edge adapted to be positioned away from the vehicle with respect to the respective proximal edge;

wherein there is a continuous boundary formed where the top fairing surface meets the top surface of the rear vehicular component and where the first and second side surfaces meet respecteive sides of the rear vehicular component;

wherein an area bounded by the distal edges of the surfaces is smaller than an area bounded by the proximal edges; and wherein the distal and proximal edges of the surfaces are positioned relative to each other such that the fairing structure, when positioned adjacent the rear vehicular component of the vehicle in the gap between said rear vehicular component and the front vehicular component of the vehicle impedes transverse and vertical flow in the gap, thereby creating an effective closure of the gap;

the rear end structure comprising a first semi-rigid surface having a first edge, a second edge, and a third generally non-linear edge joining the first and second edges, wherein the chord line of the third generally non-linear edge forms less than a right angle with the first edge;

the first semi-rigid surface for being rotatably secured to the rear vehicular component of the vehicle at the first edge to permit the first semi-rigid surface to assume a first position adjacent the rear vehicular component and a second position extended from the rear vehicular component, wherein the first semi-rigid surface comprises two joined panels to permit the first semi-rigid surface to be folded when in the first position and unfolded when in the second position;

a second semi-rigid surface having a fourth edge, a fifth edge and a sixth generally non-linear edge joining the fourth and fifth edges, wherein the chord line of the sixth generally non-linear edge forms less than a right angle with the fourth edge;

the second semi-rigid surface for being rotatably secured to the vehicle at the fourth edge to permit the second semi-rigid surface to assume a first position adjacent the vehicle and a second position extended from the vehicle; and the first and second semi-rigid surfaces joined together at their third and sixth generally non-linear edges to permit the first and second semi-rigid surfaces to fold approximately together when the first and second semi-rigid surfaces are adjacent the vehicle; and the first and second side structures each comprising a surface extending vertically toward the ground from a side of the vehicle, wherein the first side structure and the second side structure are adapted to be attached to opposite sides of a vehicle;

the surface having a first edge toward the front of the vehicle and a second edge toward the rear of the vehicle.

2. The vehicle fairing system according to claim 1, wherein the first and second edges of the first and second side structures curve inward toward the center of the vehicle.

3. The vehicle fairing system according to claim 1, wherein the surface of the first and second side structures is formed to fit around the rear wheels of the vehicle.

4. The vehicle fairing system according to claim 1, further comprising first and second panels extending from the second edge of each side structure toward the rear end of the vehicle at an angle between 90 and 180 degrees.

5. The vehicle fairing system according to claim 4 further comprising an element connecting the first and second panels extending from the second edge of each side structure.

6. A tractor trailer combination comprising the vehicle fairing system according to claim 1.

* * * * *